United States Patent [19]

Chin et al.

[11] 4,410,913
[45] Oct. 18, 1983

[54] TUNING DISPLAY FOR A TELEVISION RECEIVER

[75] Inventors: Danny Chin, Plainsboro; Robert J. Maturo, Bricktown, both of N.J.

[73] Assignee: RCA Corporation, New York, N.Y.

[21] Appl. No.: 315,615

[22] Filed: Oct. 28, 1981

[51] Int. Cl.³ ............................................. H04B 1/16
[52] U.S. Cl. ............................... 358/192.1; 455/154; 455/180; 455/188; 455/195
[58] Field of Search ............... 358/191.1, 192.1, 193.1; 455/150, 154, 170, 176, 179, 180, 187, 188, 190; 334/15, 86, 87

[56] References Cited

U.S. PATENT DOCUMENTS

| | | | |
|---|---|---|---|
| 4,241,361 | 12/1980 | Kamiya | 358/10 |
| 4,249,132 | 2/1981 | Griepentrog | 455/180 |
| 4,249,255 | 2/1981 | Molinari | 455/176 |
| 4,249,256 | 2/1981 | Molinari et al. | 455/180 |
| 4,307,467 | 12/1981 | Bridgewater | 455/176 |
| 4,349,840 | 9/1982 | Henderson | 358/191.1 |

FOREIGN PATENT DOCUMENTS 2432600 of 0000 Fed. Rep. of Germany .

OTHER PUBLICATIONS

Sony KV-4000 Schematic Diagram and Operation Manual, pp. 10-15, 1980.
Hitachi CT0911 Service Manual, Jan. 1981.
RCA Television Service Data, CTC-107, File 1981-C-2, pp. 1-4, 8-14, 21, 24-29, 33; and Supplement File 1981-C-S2, pp. 1-6.
C6-641, Hitachi TV Receiver, Schematic Diagram, from Japanese publication dated 1981.
18CT-C55W, City Face 18 TV Receiver, Brochure and Schematic Diagram.
TH3-W3V Matsushita TV Receiver, Schematic Diagram.

Primary Examiner—Tommy P. Chin
Attorney, Agent, or Firm—E. M. Whitacre; P. J. Rasmussen; C. A. Berard, Jr.

[57] ABSTRACT

In television (TV) receivers, the VHF-TV band including channel 2–13 is perceived by most viewers as being a single TV band even though it is in fact partitioned into lower and upper frequency portions, including channels 2-6 and 7-13, respectively, which are separated by a gap. Voltage controlled tuning systems for such TV receivers employ a tuning voltage which varies over substantially the same range of magnitudes from a lower voltage to a higher voltage for each of the frequency portions of the VHF band. Accordingly, conventional channel indicators responsive to the magnitude of the tuning voltage partition the bands to avoid ambiguity in the channel indication. In the present arrangement, a tuning indicator produces an on-screen bar display having a position which is indicative of the selected channel for all VHF channels as if the VHF frequency band was continuous and not partitioned thereby being consistent with the perception of most viewers. Specifically, the tuning indicator includes a divider device for attenuating the tuning voltage when a channel in the lower or upper VHF band is selected, a device for developing an offsetting voltage when the selected channel is in the upper VHF band, and a device for combining the attenuated tuning voltage and the offsetting voltage to develop a control signal which determines the position of the bar on the TV screen.

13 Claims, 7 Drawing Figures

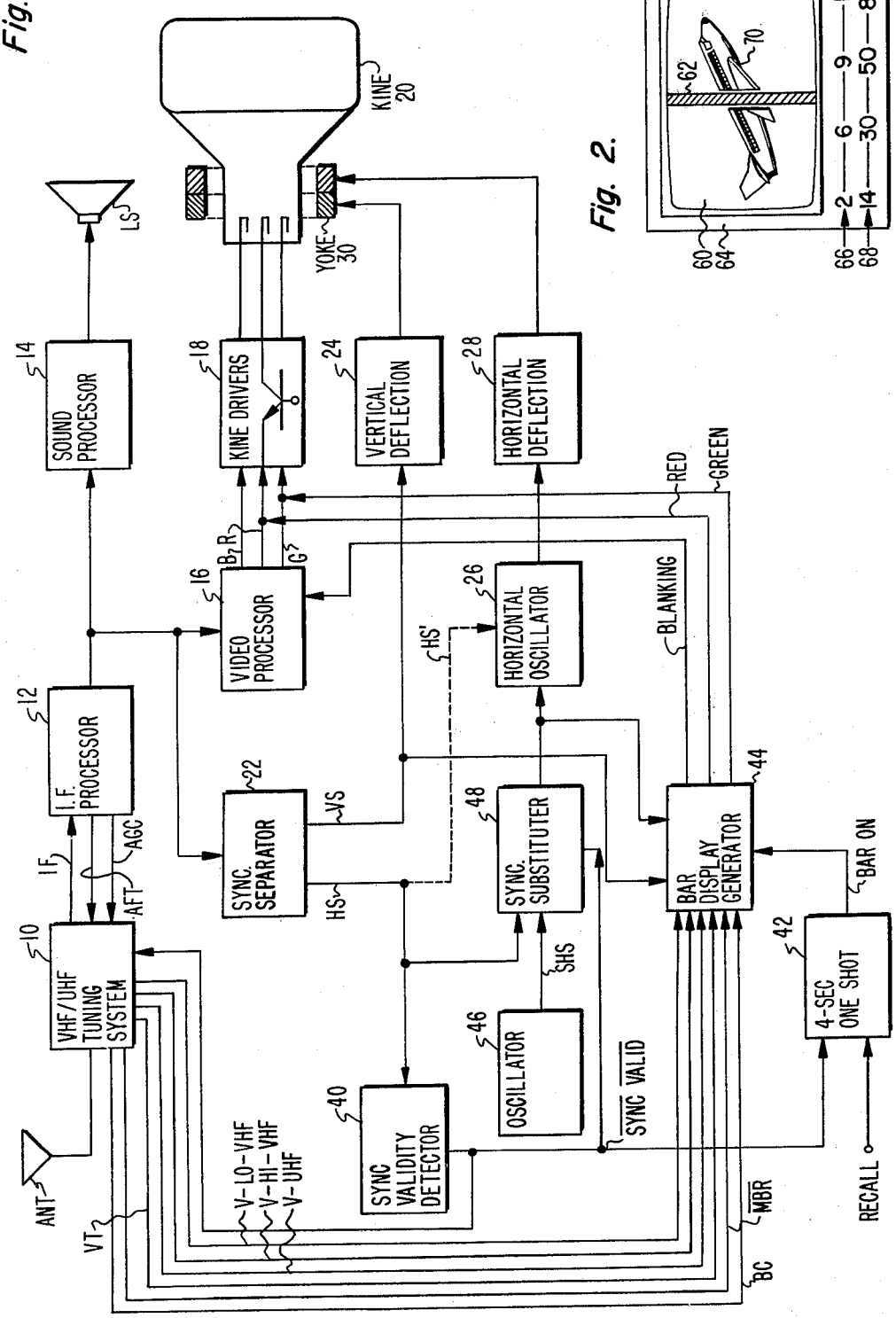

TUNING DISPLAY FOR A TELEVISION RECEIVER

The present invention relates to tuning indicators for television receivers and, in particular, for displaying an apparently continuous tuning indication where the tuning band is in fact discontinuous.

The VHF-TV frequency band, including channels 2–13, is perceived by most viewers as being a single TV band even though it is in fact partitioned into lower and upper frequency portions including channels 2–6 and 7–13, respectively, which are separated by a gap. Voltage controlled tuning systems for such TV receivers employ a tuning voltage which varies over substantially the same range of magnitude from a lower to a higher voltage for each of the frequency portions of the VHF band. Accordingly, conventional channel indicators responsive to the magnitude of the tuning voltage partition the frequency bands to avoid ambiguity in the channel indication.

Tuning indicators of that sort include a display of a vertical or horizontal bar on a TV screen where the position of the bar, horizontally or vertically, respectively, provides an approximate indication of channel selection. The bar position is determined from the magnitude of the tuning voltage. Because tuning voltage is ambiguous as between the lower and upper portions of the VHF-TV band, band partitioning and some auxiliary indication is necessary to unambiguously indicate the selected channel.

Such channel indicators might be confusing to some viewers because the display partitions the VHF-TV band contrary to the viewers' perception of a single VHF-TV band. In addition, where the viewer must manually select the band in which tuning is to be accomplished, the tuning process can become more complex and inconvenient due to the increased number of bands. Moreover, the controls necessary as a result of partioning the VHF band into separate bands tends to unnecessarily increase the cost of the TV receiver.

Some TV receivers have employed mechanical tuning potentiometers having segmented resistance elements and/or segmented conductive rings positioned for developing tuning voltage, band indicating signals or display control signals. Such mechanical potentiometers are disadvantageously complex and expensive unlike the electronic apparatus described herein.

Therefore, there is a need for a tuning indicator which provides an unambiguous, approximate indication of the TV channel selected but which does not entail substantial additional complexity or cost. Such display is particularly advantageous when employed in conjunction with a low-cost scanning-type tuning system in a low cost TV receiver.

The foregoing problems are overcome when the present invention is employed in a TV receiver including a tuning device for developing a tuning signal to select one TV signal and for developing band signals to indicate the one of the lower and upper portions of a frequency band which includes the selected TV signal. The tuning signal varies between first and second magnitudes for each of the upper and lower portions of the frequency band. A processing device displays a TV picture responsive to the selected signal and a tuning indicator is responsive to a control signal for developing a tuning indication of the selected TV signal. Control apparatus which develops the control signal to cause the displayed indication to appear as if the lower and upper portions of the frequency band were substantially continuous comprises a divider for proportioning the tuning signal when the selected TV signal is in the lower and upper portions, a device responsive to the band signals for generating an offsetting signal when the selected TV signal is included in one of the lower and upper portions, and a device for combining the proportioned tuning signal and the offsetting signal to develop the control signal.

In the drawing:

FIG. 1 is a schematic block diagram of a TV receiver including the present invention;

FIG. 2 is a view of a television display;

Figure 3:
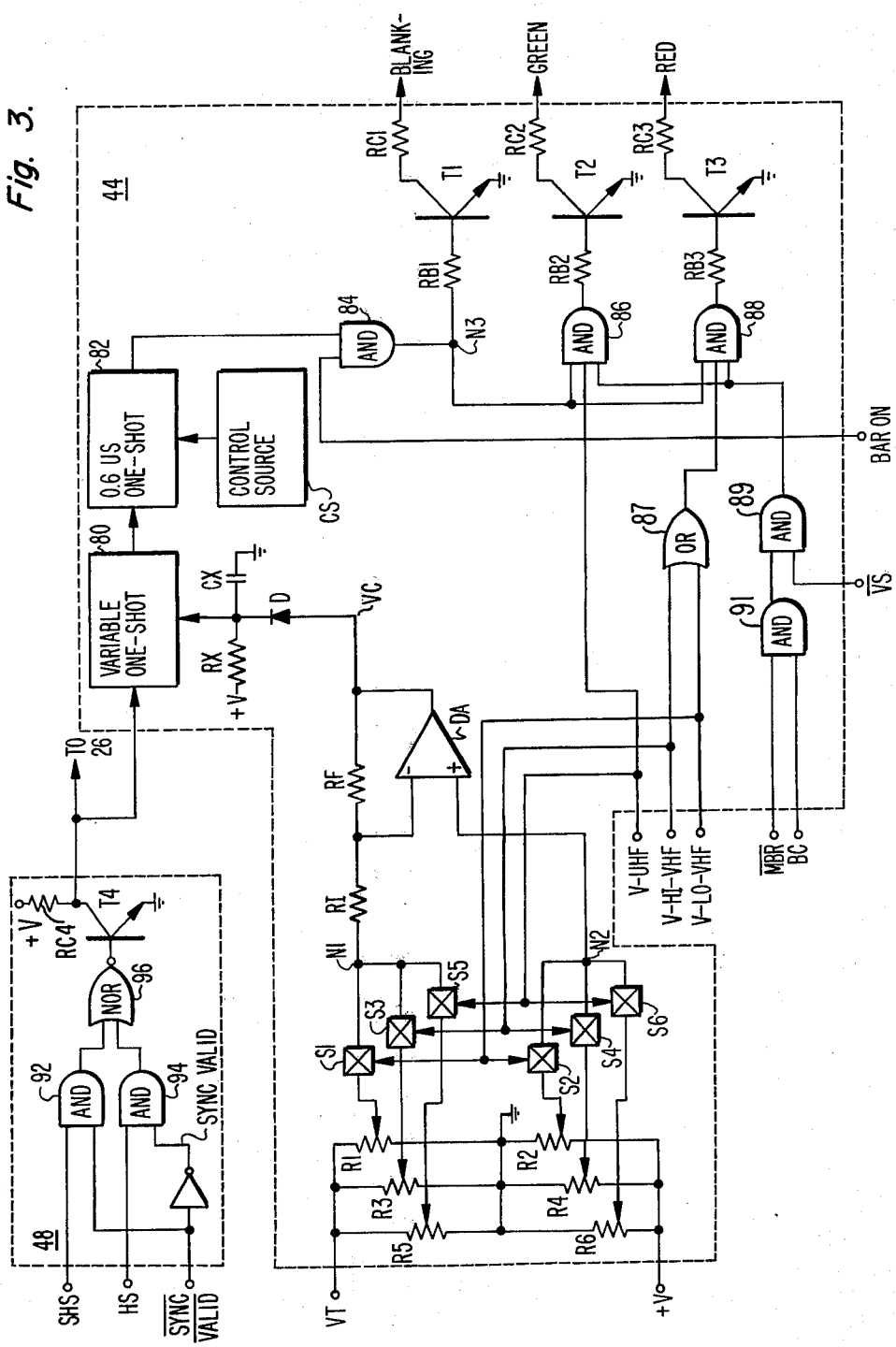
FIGS. 3, 5 and 6 are diagrams partially in schematic and partially in block form of apparatus useful in the TV receiver of FIG. 1.

In the TV receiver shown in FIG. 1, TV signals are received through antenna ANT by tuning system 10 for TV signals including, e.g., channels 2–13 in the VHF-TV frequency band and channels 14–83 in the UHF-TV frequency band. Tuning system 10 develops band signals V-LO-VHF, V-HI-VHF and V-UHF to select the one of the lower VHF, upper VHF or UHF bands, respectively, in which the selected TV signal channel is included. Tuning system 10 further develops tuning voltage VT in response to which it specifically tunes the selected TV signal in that band. IF signals from tuning system 10 are applied to IF processor 12 which develops automatic fine tuning (AFT) and automatic gain control (AGC) signals for controlling tuning system 10 and further develops a composite video signal.

Sound processor 14 develops from the composite video signal audio program information which is reproduced by loudspeaker LS.

Video processor 16 develops video signals in response to the composite video signal. In a color TV receiver in particular, video processor 16 develops blue (B), red (R) and green (G) color video signals responsive to the chrominance information in the composite video signal, each of which color video signals further includes luminance information. Kine drivers 18 couple the B, R and G color video signals to corresponding electrodes of kine display tube 20 upon which color picture information is displayed.

Sync separator 22 develops vertical synchronization signal VS which is applied to vertical deflection circuits 24 for developing periodic vertical deflection signals for driving the vertical deflection portion of yoke 30. Horizontal synchronization signal HS developed by sync separator 22 is conventionally applied via phantom path HS' for synchronizing horizontal oscillator 26 which drives horizontal deflection circuits 28 for developing periodic horizontal deflection signals in the horizontal portion of yoke 30.

A picture program display is developed on the screen of kine 20 in response to the B, R and G color video signals and the vertical and horizontal deflection signals. The TV receiver thus far described is conventional and an and an exemplary receiver is described in detail in RCA Television Service Data, Chassis CTC-107, File 1981 C-2 and Supplement 1981 C-2-S2, published by RCA Corporation, Consumer Electronics, Indianapolis, Indiana, which data is incorporated herein by reference.

Bar display generator 44 develops an on-screen tuning display. In FIG. 2, TV picture program information 70 is displayed on TV screen 60. A tuning indication, for example, vertical bar 62 is also displayed on screen 60, at least at selected times. Channel numerals 66 for VHF-TV channels 2–13 and channel numerals 68 for UHF-TV channels 14–83 are provided on panel 64 proximate to screen 60. Bar 62 is moved leftward and rightward so that its position relative to channel numerals 66 and 68 indicates the channel number of the selected TV channel. So that bar 62 appears uniform and accentuated, picture information 70 is blanked on the portion of screen 60 where bar 62 is displayed. This is indicated in FIG. 2 by the gap in picture 70 where it intersects with bar 62.

Figure 4A:
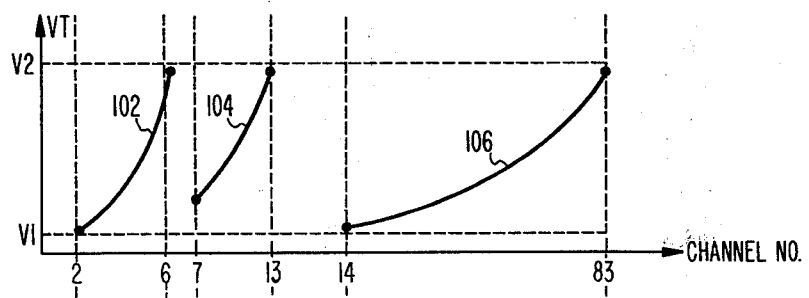
FIG. 4 is a graphical representation of characteristics associated with the TV receiver of FIG. 1.
Figure 4B:
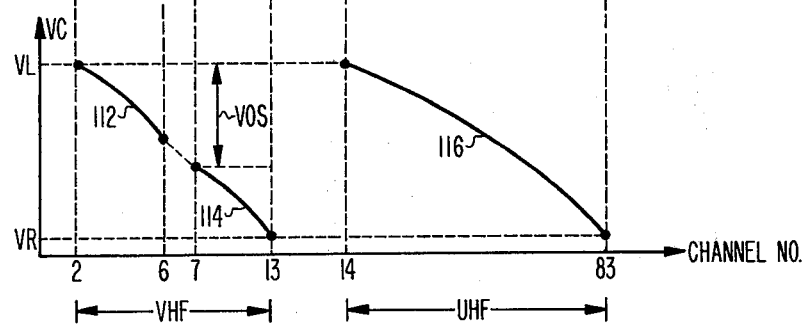

In the VHF-TV band, channels 2–6 (54–88 MHz) are separated from channels 7–13 (174–216 MHz) by a gap (88–174 MHz). Tuning voltage VT developed by tuning system 10 varies between about 0.5–2 volts for voltage level V1 and 20–30 volts for voltage level V2, or about a 20–30 volt range, as illustrated by the graphical representation of FIG. 4a. VT characteristics 102 for the lower portion of the VHF-TV band, 104 for the upper portion thereof, and 106 for the UHF-TV band are ambiguous with respect to the channel selected. However, by employing VT in conjunction with band signals V-LO-VHF, V-HI-VHF and V-UHF in accordance with the present invention, a non-ambiguous tuning indication, such as that of control voltage VC shown in FIG. 4b, is obtainable. Control voltage VC is developed within bar generator 44 for controlling the position of bar 62 on screen 60 as described in detail below.

Bar display generator 44 is described in detail with reference to FIG. 3. Tuning voltage VT is proportioned by voltage dividers R1, R3 and R5 shown by way of example as potentiometers. The proportioned VT signals at the intermediate points of R1, R3 and R5, at which their wiper arms are positioned, are respectively coupled to node N1 through switches S1, S3 and S5. S1, S3 and S5 are rendered respectively conductive by bandswitch signals V-LO-VHF, V-HI-VHF and V-UHF when the selected TV signal is included in the lower VHF, upper VHF or UHF bands, respectively.

In similar fashion, offsetting potentials are developed at node N2 when the potential at the respective wiper arms of potentiometers R2, R4 and R6, developed from operating potential +V, is coupled to node N2 by switches S2, S4 and S6. S2, S4 and S6 are rendered respectively conductive by the aforementioned band signals.

Amplifier DA combines the proportioned tuning voltage at node N1 and the offsetting voltage at N2 to develop a control signal VC which is coupled through diode D to the control terminal of variable one-shot (monostable multivibrator) 80. Amplifier DA modifies the proportioned tuning voltage at N1 by a factor $-RF/RI$ and the offsetting voltage at N2 by a factor $[1+(RF/RI)]$, where RI and RF are the values of resistances RI and RF.

In particular, where bar generator 44 of FIG. 3 employs a CD4098B dual monostable multivibrator COS/MOS integrated circuit, available from RCA Solid-State Division, Somerville, N.J., for one-shots 80 and 82, control signal VC has about a 1.5 volt range as developed at diode D. Switches S1–S6 employ CD4016B quad bilateral switch COS/MOS integrated circuits also available from RCA Solid-State Division.

The greatest magnitude control signal VC is voltage VL in FIG. 4b which positions bar 62 near the left edge of screen 60; and decreases therefrom move bar 62 towards the right. At VC equal to voltage VR, bar 62 is at the right edge of screen 62.

For low VHF channels 2–6, control voltage VC follows characteristic 112 of FIG. 4b. Potentiometer R2 is adjusted to develop VC=VL to position bar 62 at numeral "2" of indicia 66 when channel 2 is selected. With channel 6 selected, potentiometer R1 is adjusted to proportion VT to develop VC of value so that bar 62 as at numeral "6" of indicia 66. For high VHF channels 7–13, control voltage VC follows characteristic 114. R4 is adjusted so that the offsetting potential developed at N2 causes control voltage VC at diode D to be of value VL less offsetting voltage VOS so that bar 62 is positioned at numeral "7" (not shown) of indicia 66 when channel 7 is selected. With channel 13 selected, R2 is adjusted to develop VC=VR to position bar 62 at numeral "13".

For UHF channels 14–83, VC follows characteristic 116. R6 is adjusted to develop VC=VL to position bar 62 at numeral "14" of indicia 68 when channel 14 is selected; R5 is adjusted to develop VC=VR to position bar 62 at numeral "83" with channel 83 selected.

Variable one-shot 80 develops a trigger pulse signal at its output connection. The beginning of the trigger pulse signal substantially coincides with the synchronization pulse received from sync substitutor 48; the termination of the trigger pulse signal is delayed from that synchronization pulse by a time period determined by the magnitude of the control signal received from the cathode of diode D. The delay time is shorter than the period of the horizontal deflection signal. Resistor RX and capacitor CX are connected between +V and ground, and determine the maximum duration of the trigger pulse. The control signal reduces that duration by restricting the range of voltage over which CX is charged and discharged.

One-shot 82 produces a pulse signal at its output connection which commences at the termination of the trigger signal from one-shot 80 and which has a duration directly controlled by a signal from control source CS. Commonly, control source CS supplies a fixed magnitude control signal so that the pulse signal from one-shot 82 is of substantially constant time duration and is substantially shorter than the period of the horizontal deflection signal. The bar pulse signal from one-shot 82 is desirably of about 0.6 microseconds duration to determine the width of the bar display and is generated between about 2 and 58 microseconds after a synchronization signal is received from 48 so to position the bar display between the left- and right-hand edges of the displayed picture. That bar pulse signal is developed and applied to an input of AND gate 84 irrespective of whether a bar is to be displayed or not.

When a tuning indication is to be displayed, a BAR ON signal is applied to the other input of AND gate 84 so that the bar pulse signal developed by one-shot 82 is coupled to node N3. The bar pulse is applied to common-emitter NPN driver transistor T1 via its base resistor RB1 and is coupled through resistor RC1 as a BLANKING signal. By way of example, that BLANKING signal can be connected to the base of vertical blank transistor Q702 shown in FIG. 21 of the CTC-107 Service Data referred to above. Alternatively, the BLANKING signal can be inverted and applied to TP 806 also shown in FIG. 21 thereof.

When the TV channel selected for viewing is in either the upper or lower portion of the VHF band, the appropriate one of band signals V-LO-VHF and V-HI-VHF are applied through OR-gate 87 to an input of AND gate 88 so that the bar pulse signal at node N3 passes via resistor RB3, driver transistor T3 and resistor RC3 to develop a RED color video signal to produce a red-colored bar display. Similarly, if the selected TV channel is in the UHF band, band signal V-UHF is applied to an input of AND gate 86 so that bar pulses from N3 causes resistor RC2, driver T2 and resistor RC2 to develop GREEN color video signals to produce a green-colored bar display. By way of example, the RED color video signal can be applied to the emitter of RED driver transistor Q5001 and the GREEN color video signal can be applied to the emitter of GREEN driver transistor Q5002, both shown in FIG. 22 of the CTC-107 Service Data referred to above.

The bar display can be inhibited under certain conditions so that degradation of its appearance does not occur. For example, signal $\overline{VS}$ applied via AND gate 89 inhibits both RED and GREEN color video signals during vertical retrace. By way of further example, the RED and GREEN color video signals are inhibited by AND gate 91 in response to band change signal BC when the tuning system changes from one band to another, such as between the VHF and UHF bands, and in response to mid-band reset signal $\overline{MBR}$ when the tuner changes over the gap between channels 6 and 7 in the VHF band. As a result, the position of the bar display is not changed in a confusing manner due to transients of tuning voltage VT or of the bandswitch voltages when the tuning system changes between bands or between portions of the VHF band.

A bar tuning display is desired whenever tuning is being performed and for a short time, for example, four seconds, thereafter, as well as on viewer demand. To that end, one-shot 42 in FIG. 1 develops the BAR ON signal for a four-second period responsive to a RECALL signal developed, for example, by the viewer depressing a pushbutton. While channel tuning is in process, horizontal synchronization signals HS are unavailable from received TV signals. Sync validity detector 40 compares the average level of received synchronization signal HS against a threshold level to develop a $\overline{SYNC\ VALID}$ indication which is present during tuning. One-shot 42 develops the BAR ON signal continuously so long as $\overline{SYNC\ VALID}$ signal is applied and for four seconds after the $\overline{SYNC\ VALID}$ signal is removed when valid synchronization signals are detected.

To avoid bar display tuning indication 62 from being jagged or erratic owing to the absence of an adequate sync signal, sync substitutor 48 ensures that appropriate synchronization signals are always applied to horizontal oscillator 26. To that end, oscillator 46 develops secondary horizontal synchronization signals SHS at the standard horizontal frequency of 15,575 Hz which are applied to sync substitutor 48, as are received horizontal synchronization signals HS when they are present. With respect to the detailed diagram of sync substitutor 48 shown as part of FIG. 3, $\overline{SYNC\ VALID}$ signal is applied to AND gate 92, and is inverted and applied as SYNC VALID signal to AND gate 94. As a result, synchronization signal HS is applied to NOR gate 96 when HS is present and valid, and synchronization signal SHS is applied to NOR gate 96 when HS is not present or not valid. NOR gate 96, resistor RC 4 and inverting buffer amplifier transistor T4 together comprise an OR gate to generate synchronization signals applied to horizontal oscillator 26.

Figure 5:
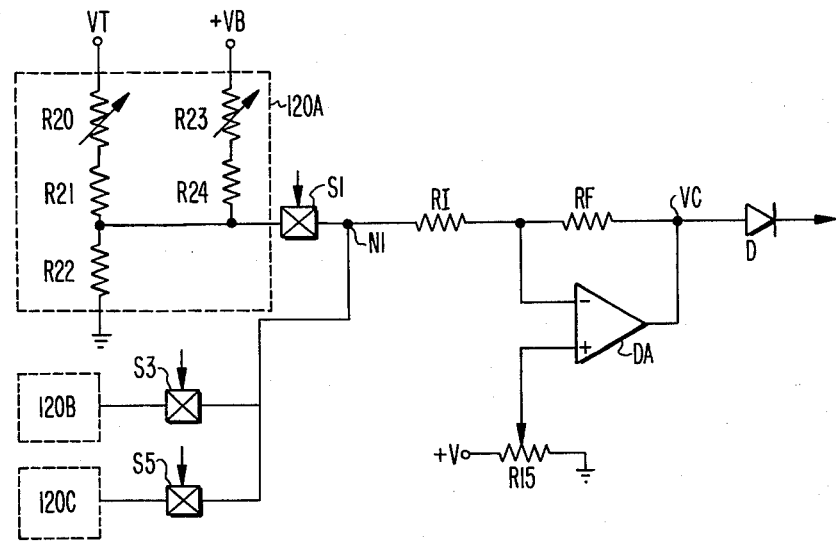

FIG. 5 shows a modification of the embodiment described above in relation to FIG. 3. R2, R4, R6, S2, S4 and S6 has been eliminated and replaced by potentiometer R15. R15 is adjusted so that the voltage developed at its wiper is applied to the non-inverting (+) connection of amplifier DA so that DA develops VC=VL. Network 120A serves the same function as potentiometers R1 and R2 of FIG. 3. Tuning voltage VT is proportioned substantially by R20, R21 and R22. R20 is adjusted for positioning bar 62 in like manner to that described above for R1. Bias voltage +VB is applied through resistors R23 and R24 to switch S1. R23 is adjustable for setting VC=VR for positioning bar 62 as was described above for resistor R2. Switch S1 is rendered conductive by band signal V-LO-VHF when the selected TV channel is in the lower VHF-TV band.

Networks 120B and 120C are similar to network 120A and are employed for positioning bar 62 when the selected channel is in the upper portion of the VHF-TV band and in the UHF-TV band, respectively. However, with respect to network 120B, the variable resistor corresponding to R23 of 120A is employed for developing an offsetting potential; variable resistor R23 is adjusted to establish VC=VL−VOS when channel 7 is selected.

With an embodiment of the sort shown in FIG. 5 connected to an RCA CTC-107 TV receiver, with RI=RF=100 kilohms, with diode D comprising two 1N914 diodes in series, and with DA being an LM358 operational amplifier available from National Semiconductor Corp., Santa Clara, CA., the following voltages were measured:

TABLE I

| TV Band | Low VHF | High VHF | | UHF | |
|---|---|---|---|---|---|
| Channel No. | 2 | 6 | 7 13 | 14 | 83 |
| Control Voltage VC | 3.1 | 2.5 | 2.2 1.5 | 3.0 | 1.6 |
| Tuning Voltage VT | 0.9 | 16.1 | 7.3 20.4 | 0.7 | 20.3 |
| Combined Proportional VT & Offsetting Voltage at N1 | 1.8 | 2.4 | 2.5 3.4 | 1.9 | 3.3 |
| Voltage at DA+ | 2.5 | 2.5 | 2.5 2.5 | 2.5 | 2.5 |

Examination of the data listed in Table I reveals striking similarities between the values of VC and VT under differing conditions. Specifically, the respective values of VC and VT are substantially the same when either channel 2 or 14 is selected. Moreover, the respective values of VC and VT with channel 13 or 83 selected are also substantially the same. Taking advantage of these similar values permits additional simplification of bar generator 44, such as that shown in the embodiment of FIG. 6.

Figure 6:
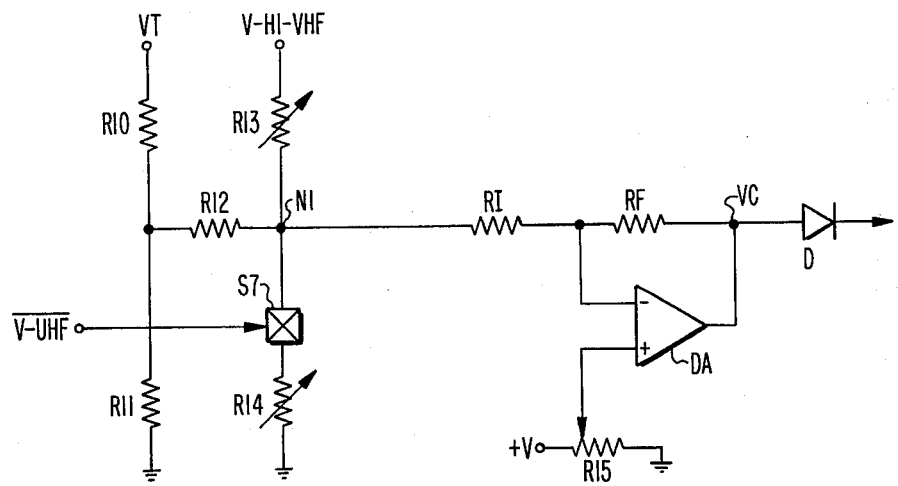

FIG. 6 shows an embodiment modified from that described in relation to FIG. 5 in that networks 120A, 120B and 120C, and switches S1, S3 and S5 are replaced by resistors R10-R14 and switch S7. Tuning voltage VT is proportioned by the voltage divider comprising resistors R10 and R11 so that the change in VC is substantially VL-VR. When the selected channel is in the VHF frequency band, signal $\overline{V\text{-}UHF}$ is applied rendering switch S7 conductive to connect resistance R14 between node N1 and ground. The additional proportioning introduced by the voltage divider including R12 and R14 further attenuates VT so that the changes in control voltage VC are proportioned for characteristics 112 and 114 as compared to 116 in FIG. 4b. R14 is shown as a variable resistor for adjusting VC=VR.

When the selected channel is in the UHF-TV band, $\overline{\text{V-UHF}}$ is not applied so that S7 is nonconductive and VT is attenuated substantially by R10 and R11 for proportioning characteristic 116 of control voltage VC. When the selected channel is in the upper portion of the VHF-TV band, band voltage V-HI-VHF is applied through resistance R13 to develop an offsetting voltage which is combined at node N1 with the proportioned VT voltage. R13 is adjusted so that control voltage VC is offset by VOS from VL. It is equally satisfactory that signal $\overline{\text{V-UHF}}$ be developed by inverting band signal V-UHF or by combining V-LO-VHF and V-HI-VHF such as by a diode-ORing circuit.

Modifications are contemplated to the present invention which should be limited in scope solely by the claims following. For example, the present invention is equally satisfactory whether used in conjunction with black and white or color TV receivers and may employ either a horizontal or vertical bar type display of tuning information. Moreover, it is equally satisfactory that the tuning information be conveyed by the position of a contrasting bar as described herein or by varying the length of such bar, in which case the variable end of the bar would indicate the selected channel by its correspondence with numerals of indicia 66 and 68 on panel 64.

Although the embodiments of bar generator 44 of FIGS. 3, 5 and 6 have been described as developing an offsetting voltage when the selected TV channel is in the upper portion of the VHF-TV band so that a characteristic of the sort shown in FIG. 4b will obtain, it is equally satisfactory that offsetting potential be developed when the selected channel is in the lower portion of the VHF-TV band. In that case, the offsetting potential would be of polarity sense to shift characteristic 102 in voltage relative to characteristic 104 such that combined characteristics 112 and 114 result.

Additionally, it is equally satisfactory that the present invention be employed in conjunction with a display separate from the TV screen. For example, with a plurality of light-emitting diodes (LED) linearly arrayed, the variable time delay pulse developed by one-shot 80 can be employed to determine the number of LEDs illuminated. The illuminated LEDs appear as the equivalent of a "bar" of variable length the end of which corresponds to numerals on indicia 66 and 68 to indicate the selected channel.

While control source CS of FIG. 3 is described as supplying a fixed control signal to one-shot 82, it is equally satisfactory that CS supply a control signal variable in response to another parameter to be displayed. For example, the strength of the received signal which is readily determinable from the magnitude of AGC voltage developed by IF processor 12 can be applied to CS to vary the width of bar 62.

Additionally, to provide a limited and more precise adjustment for the proportioned tuning voltages and offsetting voltages discussed above in relation to FIG. 3, each of potentiometers R1–R6 could be reduced in resistance value and reconnected with a respective fixed resistance connected in series with each of its respective ends.

What is claimed is:

1. In a television (TV) receiver which receives TV signals in at least one frequency band which has a plurality of TV channel signals included in lower- and upper-frequency portions thereof separated by a gap, including tuning means for developing a tuning signal to select one of said TV channel signals and for developing band signals to indicate the one of said lower- and upper-frequency portions which includes said selected one TV channel signal, wherein said tuning signal varies between first and second magnitudes for ones of said TV channel signals in each of said lower- and upper-frequency portions, and wherein said tuning signal can have similar magnitudes for different ones of said TV channel signals, processing and display means for displaying a TV picture responsive to said selected one TV channel signal, and tuning indicator means responsive to a control signal for developing a tuning indication of said selected one TV channel signal;

electronic control apparatus for developing said control signal in response to said tuning signals and to said band signals to have different magnitudes corresponding to different ones of said plurality of TV channel signals, comprising:

divider means for developing a proportioned tuning signal in response to said tuning signal;

offsetting means for developing an offsetting signal in response to said band signals, said offsetting signal having a magnitude corresponding to the one of said lower- and upper-frequency portions which includes said selected one TV channel signal; and combining means, coupled to said divider means and to said offsetting means, for combining said proportioned tuning signal developed by said dividing means and said offsetting signal developed by said offsetting means to develop said control signal.

2. The control apparatus of claim 1 wherein said dividing means comprises first voltage divider means receiving said tuning signal at a first end thereof and receiving a reference signal at a second end thereof for developing said proportioned tuning signal at an intermediate connection thereof.

3. The control apparatus of claim 2 wherein said dividing means further comprises:

second voltage divider means receiving said tuning signal at a first end thereof and receiving said reference signal at a second end thereof for developing said proportioned tuning signal at an intermediate connection thereof;

a terminal; and switch means for selectively connecting the intermediate connection of said first voltage divider means to said terminal when said selected one TV channel signal is included in said lower-frequency portion and for selectively connecting the intermediate connection of said second voltage divider means to said terminal when said selected one TV channel signal is included in said upper-frequency portion.

4. The control apparatus of claim 1 wherein said offsetting means comprises voltage dividing means receiving a predetermined-level signal at a first end thereof and receiving a reference-level signal at a second end thereof for developing an intermediate-level signal at an intermediate connection thereof, wherein said predetermined-level signal is developed in response to said band signal indicating said upper-frequency portion and said intermediate-level signal is said offsetting signal.

5. The control apparatus of claim 1 wherein said offsetting means comprises voltage dividing means receiving a predetermined-level signal at a first end thereof and receiving a reference-level signal at a second end thereof for developing an intermediate-level signal at an intermediate connection thereof, said offsetting means further including switch means responsive to at least said band signal indicating said upper-frequency portion for selectively supplying said intermediate-level signal as said offsetting signal.

6. The control apparatus of claim 1 wherein said combining means comprises:
   amplifying means for developing said control signal at an output terminal thereof and having at least one input terminal; and
   means for applying said proportioned tuning signal and said offsetting signal to the input terminal of said amplifying means.

7. The control apparatus of claim 1 wherein said combining means comprises:
   amplifying means for developing said control signal at an output terminal thereof and having first and second input terminals; and
   means for applying said proportioned tuning signal and said offsetting signal to the first and second input terminals, respectively, of said amplifying means.

8. The control apparatus of any one of the preceeding claims 1 through 7 further comprising means coupling said tuning indicator means to said display means for causing the tuning indication developed by said tuning indicator means to be displayed on said display means.

9. The control apparatus of claim 8 wherein said tuning indicator means includes means for developing a bar display on said display means, the position of which bar display is responsive to said control signal.

10. The control apparatus of claim 9 further including a panel proximate said display means and upon which indicia of channels of said TV channel signals are provided, the indicia of a particular said channel being located on said panel according to the position of said displayed indication corresponding to said particular channel.

11. In a television (TV) receiver which receives TV signals in at least one frequency band which has a plurality of TV channel signals included in lower- and upper-frequency portions thereof separated by a gap, including
   tuning means responsive to a tuning signal for selecting one of said TV channel signals and responsive to band signals for selecting the one of said lower- and upper-frequency portions which includes said selected one TV channel signal, wherein said tuning signal varies between first and second magnitudes for ones of said TV channel signals in each of said lower- and upper-frequency portions, and wherein said tuning signal can have similar magnitudes for different ones of said TV channel signals, and
   processing and display means for displaying a TV picture responsive to said selected one TV channel signal;
apparatus comprising:
   a source for supplying a first control signal;
   divider means for developing a porportioned control signal in response to said first control signal;
   offsetting means for developing an offsetting signal in response to said band signals, said offsetting signal having a magnitude corresponding to the one of said lower- and upper-frequency portions which includes said selected one TV channel signal;
   combining means, coupled to said divider means and to said offsetting means, for combining said proportioned control signal developed by said dividing means and said offsetting signal developed by said offsetting means to develop a second control signal;
   tuning indicator means responsive to an indicating signal for developing a tuning-indicating display on said display means, the position of said tuning-indicating display on said display means corresponding to the magnitude of said indicating signal;
   means for applying one of said first and second control signals to said tuning means as said tuning signal; and
   means for applying the other one of said first and second control signals to said tuning indicator means as said tuning-indicating signal.

12. The apparatus means of claim 11 wherein said tuning indicator means comprises bar generating means for developing a bar display as said tuning-indicating display, said bar generating means including:
   delaying means for developing a pulse signal controllably delayed in response to said other one of said first and second control signals; and
   means for applying said pulse signal to said display means to produce said bar display thereon.

13. The apparatus of claim 12 wherein said bar generating means further includes a panel proximate said display means and upon which indicia of channels of said TV channel signals are provided, the indicia of a particular channel being located on said panel according to the position of said bar display indication corresponding to said particular channel.

* * * * *